United States Patent
Tang et al.

(10) Patent No.: US 7,366,748 B1
(45) Date of Patent: Apr. 29, 2008

(54) METHODS AND APPARATUS FOR FAST ARGUMENT REDUCTION IN A COMPUTING SYSTEM

(75) Inventors: Ping Tak Peter Tang, Hayward, CA (US); John Harrison, Beaverton, OR (US); Theodore Kubaska, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 09/609,496

(22) Filed: Jun. 30, 2000

(51) Int. Cl.
*G06F 7/38* (2006.01)
(52) U.S. Cl. .................................. 708/446
(58) Field of Classification Search ............. 708/501, 708/270, 495, 277, 502, 650, 200, 446; 345/420
See application file for complete search history.

(56) References Cited

U.S. PATENT DOCUMENTS

| | | | | |
|---|---|---|---|---|
| 5,220,524 | A * | 6/1993 | Hesson | 708/502 |
| 5,305,248 | A * | 4/1994 | Ammann | 708/502 |
| 5,452,241 | A * | 9/1995 | Desrosiers et al. | 708/495 |
| 5,463,574 | A * | 10/1995 | Desrosiers et al. | 708/495 |
| 5,949,422 | A * | 9/1999 | Mochizuki et al. | 345/420 |
| 6,078,939 | A * | 6/2000 | Story et al. | 708/501 |
| 6,963,895 | B1 * | 11/2005 | Comstock | 708/502 |

OTHER PUBLICATIONS

Intel Corporation, Itanium Processor Floating-Point Software Assistance and Floating-point Exception Handling, Jan. 2000, Intel Corp. chapters 1-7.*

Cody, Jr., W.J., et al., *Software Manual For The Elementary Functions*, Prentice-Hall, Inc., Englewood Cliffs, NJ 07632, pp. 1-269, (1980).

Knuth, D.E., "Polynomial Arithmetic", *The Art of Computer Programming, vol. 2, Seminumerical Algorithms*, Addison-Wesley Publishing Company, pp. 360-444, (1969).

Muller, J., *Elementary Functions—Algorithms and Implementation*, pp. 21-49 & 141-162, (1997).

Story S., et al., "New Algorithms for Improved Trnascendental Functions on IA-64", *Proceedings of the 14th IEEE Symposium on Computer Arithmetic*, Adelaide, Australia, pp. 4-11, (1999).

Tang, P.P., "Table-Driven Implementation of the Logarithm Function in IEEE Floating-Point Arithmetic", *ACM Transactions on Mathematical Software*, 16 (4), pp. 378-400, (Dec. 1990).

Tang, P.P., "Table-Lookup Algorithms for Elementary Functions and Their Error Analysis", *Proceedings of the 10th IEEE Symposium on Computer Arithmetic*, Grenoble, France, pp. 232-236, (1991).

* cited by examiner

*Primary Examiner*—Chat C. Do
(74) *Attorney, Agent, or Firm*—Schwegman, Lundberg & Woessner, P.A.

(57) ABSTRACT

There is disclosed method, software and apparatus for evaluating a function f in a computing device using a reduction, core approximation and final reconstruction stage. According to one embodiment of the invention, an argument reduction stage uses an approximate reciprocal table in the computing device. According to another embodiment, an approximate reciprocal instruction I is operative on the computing device to use the approximate reciprocal table such that the argument reduction stage provides that—C:=I (X) and R:=X×C−1, the core approximation stage provides that p(R) is computed so that it approximates f(1+R), and the final reconstruction stage provides that T=f(1/C) is fetched and calculated if necessary, and f(X) is reconstructed based on f(X)=f([1/C]×[X×C])=g(f(1/C), f(1+R)).

12 Claims, 6 Drawing Sheets

METHODS AND APPARATUS FOR FAST ARGUMENT REDUCTION IN A COMPUTING SYSTEM

TECHNICAL FIELD OF THE INVENTION

The present invention pertains generally to computers, and more particularly to method, apparatus and software for use in computing functions.

BACKGROUND OF INVENTION

The fast and accurate evaluation of algebraic and transcendental functions such as inverse square root, cube root, sine, cosine, exponential and logarithm is crucial in many fields of scientific computing. Algorithms that are most suitable for software implementation on modern computer architectures usually include three stages: *Argument Reduction, Core Approximation, and Final Reconstruction*. This well-accepted approach is discussed by Cody Jr., William I. and Waite, William, in *Software Manual for the Elementary Functions*, Prentice Hall, 1980, and by Muller, J.-M, in *Elementary functions: algorithms and implementation*, Birkhauser 1997. The three-stage approach is best illustrated by a simplified example. Consider the calculation of the exponential function exp(X). The magnitude of the input argument X has a range so large that a simple series expansion in X cannot practically deliver the accuracy required for all X. Using the conventional three-stage approach, exp(X) is calculated as follows:

- Argument Reduction: Calculate N: nearest_integer(X/log(2)); R:=X−N×log(2). At the end of this step, $|R| \leq \log(2)/2$.
- Core Approximation: Instead of having to calculate exp(X) where simple series expansion does not work, exp(R) is calculated using a simple series (polynomial) approximation. A simple series works here because the magnitude of R is limited in range.
- Final Reconstruction: The desired value exp(X) is computed based on N and exp(R) using the mathematical relationship:

$$\exp(X) = \exp(N \times \log(2) + R) = \exp(N \times \log(2)) \exp(R) = 2^N \exp(R).$$

On an architecture with abundant parallelism such as found in more recent CPU designs such as but not limited to the Itanium(R) microprocessor available from Intel Corporation, the bottleneck of these three stages is the initial argument reduction stage. The reason is that the reduction stage is usually composed of a sequence of dependent (or serial) calculations where parallelism cannot be exploited. The approximation stage usually consists of evaluation of polynomials for which parallelism can be exploited via well-known methods such as discussed in Knuth, D. E. The Art of Computer Programming vol. 2: Seminumerical Algorithms. Addison-Welsey, 1969. Muller, J.-M. Elementary functions: algorithms and implementation. Birkhauser 1997. The reconstruction step usually consists of simple calculations such as one multiplication, or one multiplication followed by an addition. The components needed for those simple calculations (such as 2N in the exp example above) can be computed during (in parallel with) the approximation stage. The consequence is that in efficient implementations on the commonly encountered algebraic and transcendental functions on systems with parallelism, the argument reduction stage can contribute a considerable percentage of the total latency. This is disproportionate from the perspective that the amount of computational work in the reduction stage is usually a fraction of that involved in the approximation stage. Further, the reduction stage usually requires some constants to be loaded from memory, which also slows down the execution of the algorithm.

DETAILED DESCRIPTION OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only be the appended claims.

Figure 1:
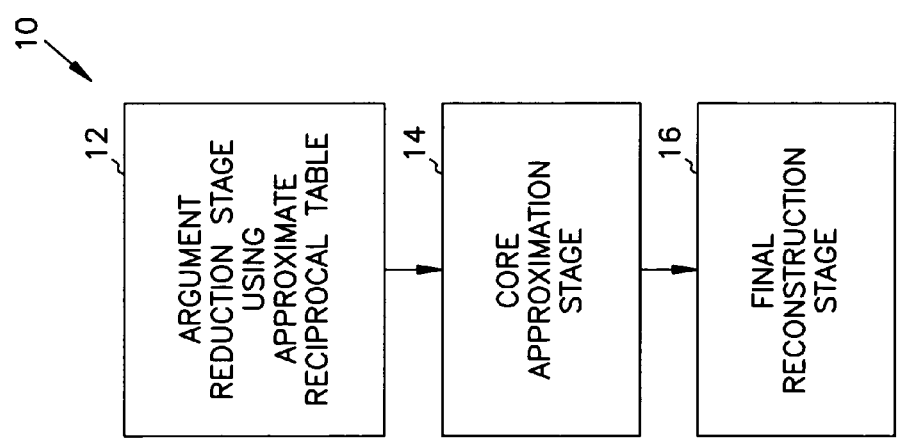
FIG. 1 illustrates a method for evaluating a function f, according to one embodiment of the invention.

Referring now to FIG. 1, there is illustrated a first embodiment of a method according to the present invention. The method 10 illustrated in FIG. 1 evaluates a function f, such as an algabraic or transcendental function, in a computing device. An argument reduction stage 12 is performed using an approximate reciprocal table in the computing device. Next, a core approximation stage 14 is performed, followed by a final reconstruction stage 16, to obtain the desired value of the function f.

According to one example embodiment, an approximate reciprocal instruction I is operative on the computing device to use the approximate reciprocal table. According to this embodiment, the argument reduction stage is performed such that $$C := I(X), \text{ and}$$

$$R := X \times C - 1.$$

The core approximation stage is then performed such that p(R) is computed so that it approximates f(1+R).

The final reconstruction stage is performed such that T=f(1/C) is fetched and calculated if necessary, and f(X) is reconstructed based on $f(X)=f([1/C]\times[X\times C])=g(f(1/C), f(1+R))$.

According to yet another example embodiment, the method accomplishes each of C:=I(X) and R:=X×C−1 in the time required to perform a floating point instruction on the computing device. Further, the final reconstruction stage can be performed, in one embodiment, in parallel with the argument reduction and core approximation stages.

In one example embodiment, the function f is in a class of functions that exhibit a i) multiplicative property such that $f(U \times V)=g(f(U),j(V))$ where g is a simple function such as addition or multiplication, and ii) simple mapping of $2^N$ such that $f(2^N)$ can be easily tabulated or calculated, where N is an integer. For example, function g is addition for a logarithm function, and function g is multiplication of cube root or inverse square root. For another example, in the case of a logarithm function f, $f(2^N)$ can be easily calculated based on N and the constant log(2). Further, in the case of a cube root function f, $f(2^J)$ for J=0, 1, 2 need only be tabulated.

According to yet another example embodiment, the approximate reciprocal table is a hardware portion of the computing device. Further, in one example embodiment, the computing device is an Itanium(R) processor available from Intel® Corporation, and wherein the instruction I is the frcpa instruction.

Figure 2:
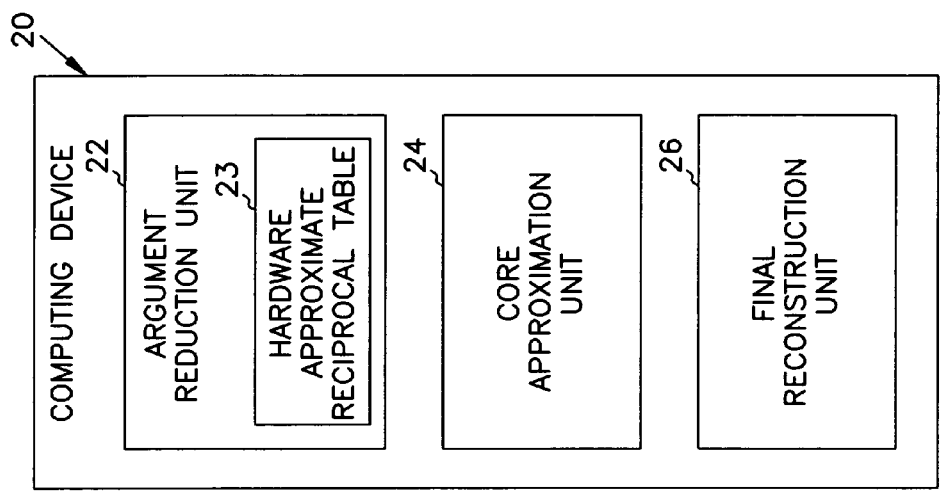
FIG. 2 illustrates an apparatus for evaluating a function f, according to one embodiment of the invention.

Referring now to FIG. 2, there is illustrated a first embodiment of a computing device 20 according to the present invention. The device 10 illustrated in FIG. 1 evaluates a function f, such as an algebraic or transcendental function, like the method described above. An argument reduction unit 22, including a hardware approximate reciprocal table 23, performs argument reduction using an approximate reciprocal table in the computing device. Next, a core approximation unit 24 performs core approximation functions, followed by operation of a final reconstruction unit 26, to obtain the desired value of the function f. According to one example embodiment, an approximate reciprocal instruction I is operative on the computing device to use the approximate reciprocal table. According to this embodiment, the argument reduction unit 22, core approximation unit 24, and final reconstruction unit 26 operate in a manner consistent with the methods described in FIG. 1. As used herein, the term "unit" means a hardware device or a combination of a hardware device and software such as a programmed computer.

Furthermore, according to yet another example embodiment, the approximate reciprocal table is a hardware portion of the computing device. Further, in one example embodiment, the computing device is an Itanium(R) processor available from Intel® Corporation, and wherein the instruction I is the frcpa instruction.

Figure 3:
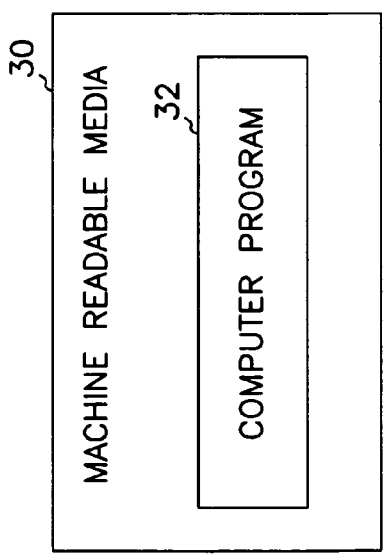
FIG. 3 illustrates a machine readable media for evaluating a function f, according to an embodiment of the invention.

According to one more example embodiment of the invention, there is provided a computer program 30 stored in a tangible machine readable media 32, illustrated in FIG. 3, wherein the program carries out the method described with respect to FIG. 1 above. Media 32 may comprise, for example, a CD-ROM, a ROM, RAM, or magnetic media, that can convey a machine readable embodiment of the program instructions or data. Program 30 is executable on a suitable hardware platform, such as a microprocessor or other computing device.

Figure 4:
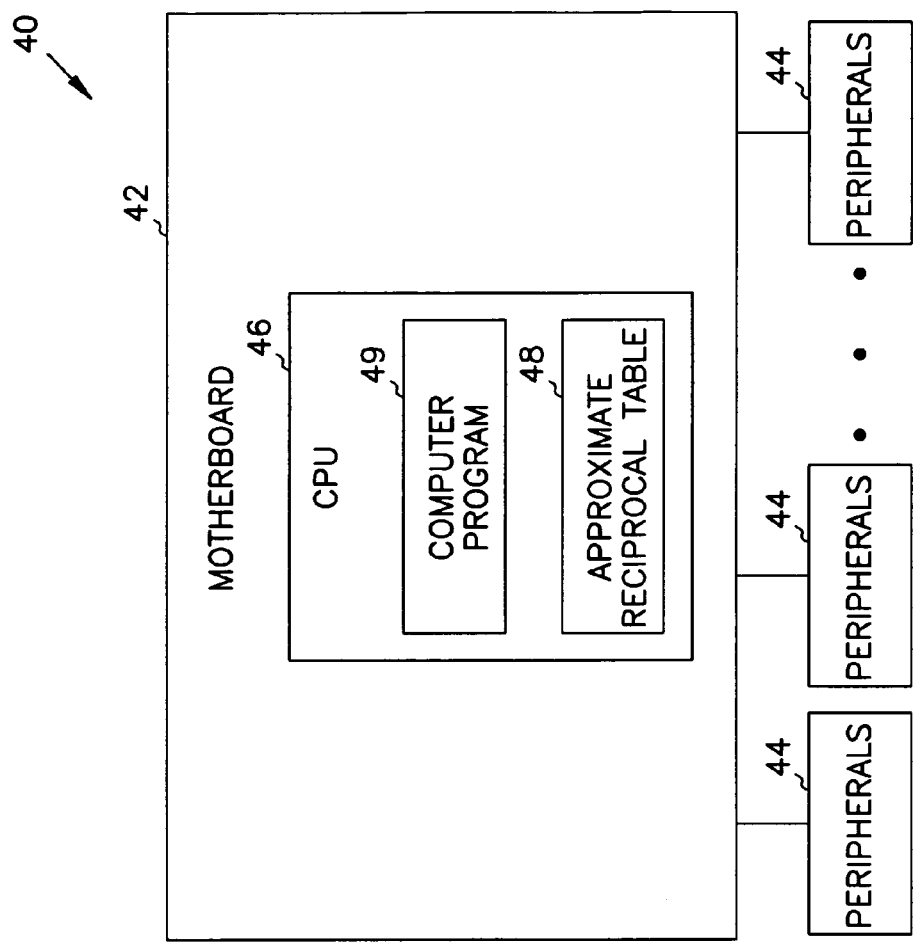
FIG. 4 illustrates a system for evaluating a function f, according to one embodiment of the invention.

Yet another embodiment of the invention is disclosed in FIG. 4, which illustrates computer system 40 having a motherboard 42 interfacing with one or more peripheral devices 44. A central processing unit (CPU) 46 is mounted on the motherboard 42, and includes an approximate reciprocal table hardware unit 48. A computer program 49 operates on the CPU to perform a multi-stage computation of a function, using the method described with respect to FIG. 1, wherein an argument reduction stage uses the reciprocal table hardware unit. According to one example embodiment, the CPU is the Itanium® processor.

EXAMPLES

Figure 5:
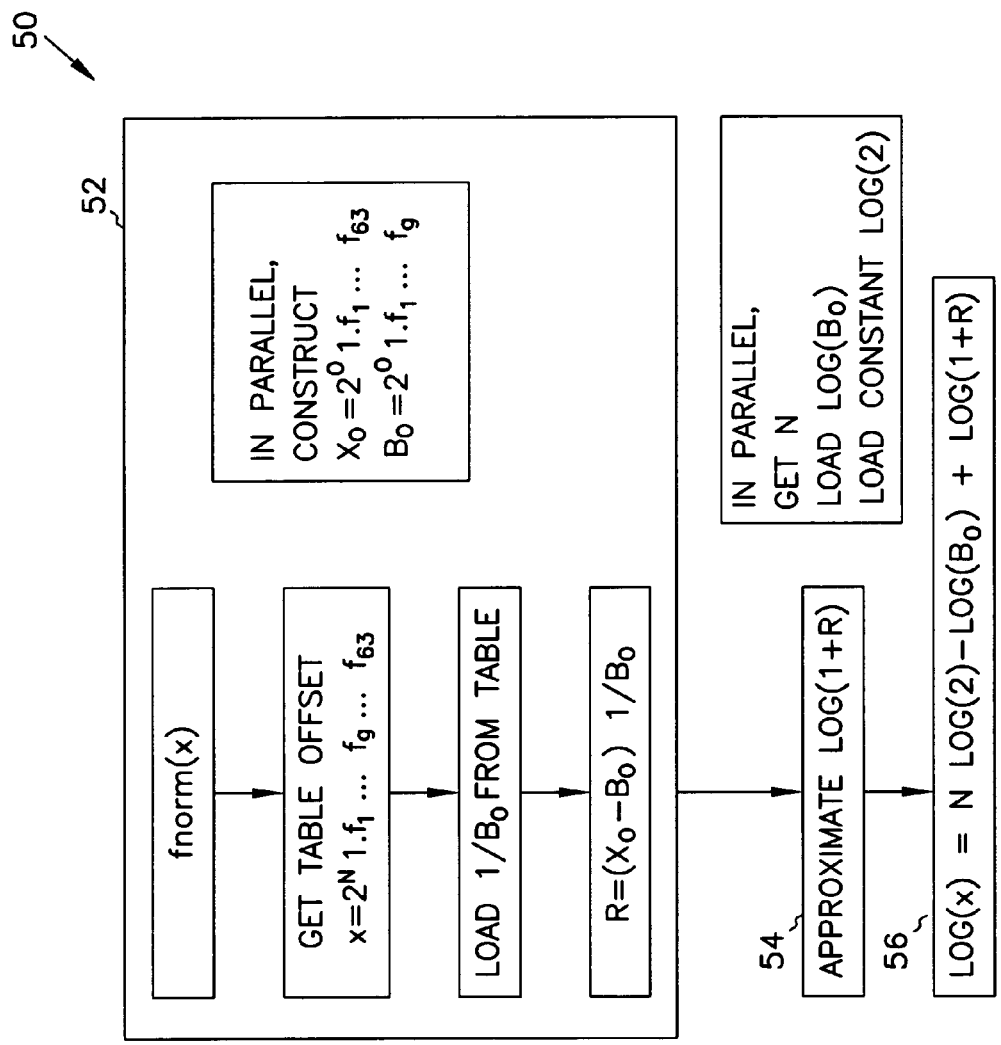
FIG. 5 illustrates conventional operations for evaluating a logarithm function log(X).

Referring to FIGS. 5, 6, 7 and 8 there is illustrated examples of the operation of the invention as contrasted with conventional computational approaches. FIG. 5 illustrates a conventional approach to computing the logarithm function log(X), using a table-driven approach which has proven to be efficient on modern computer architecture by J. M. Muller, in Elementary Functions: Algorithms and Implementation, Birkhauser 1997, by S. Story and P. T. P. Tang in New Algorithms for Improved Transcendental Functions on IA-64, Proceedings of 14th IEEE Symposium on Computer Arithmetic, 1991, by P. T. P. Tang in Table Lookup Algorithms for Elementary Functions and Their Error Analysis, Proceedings of 10th IEEE Symposium on Computer Arithmetic, 1991, and by P. T. P. Tang in Table-Drive Implementation of the Logarithm Function in IEEE Floating-Point Arithmetic, ACM Transactions on Mathematical Software, Vol. 16, 1990. When applied to the logarithm function, algorithm 50 includes the conventional argument reduction stage 52, core approximation stage 54, and reconstruction stage 56, as described further below:

Argument Reduction:
1. Normalize the representation of X to be $2^N \times 1.x_1 x_2 \ldots x_{52}$. (This assumes IEEE double precision to be specific.)
2. Extract a breakpoint based on the leading portion of X. For example, define B to be $2^N \times 1.x_1 X_2 X_3 X_4 x_5 x_6 x_7 X_8$, the leading 9 significant bits.
3. Use the eight bits $x_1$ through $x_8$ to index into a table of valued $C=2^N/B$ computed beforehand.
4. Compute the reduced argument $R=2^{-N}(X-B) \times C$.

Core Approximation:
1. Compute a polynomial p(R) that approximates the value log(1+R). Note that this polynomial consists of eight or nine terms.

Final Reconstruction:
1. Fetch from a table $T=\log(2^{-N}B)$.
2. Compute the value N×log(2).

3. Return the result N×log(2)+T+p(R). Note that T and N×log(2) can be obtained during part of the argument reduction process and the totality of the approximation process.

It is noted that when this algorithm is implemented on the Itanium(R) microprocessor, the argument reduction stage takes in the range of 30 cycles, which is a great proportion (approximately 40%) of the overall latency. Using the approach of the present invention, stage 62 takes about 10 cycles and speeds up the overall latency by about 20 cycles. Core approximation 64 and reconstruction 66 are accomplished, in one example embodiment, in generally or exactly the same manner as the method of FIG. 5. As noted above, there are two main factors contributing to the bottleneck of argument reduction. One is the serial nature of the reduction and the other is that reduction usually requires some constants to be loaded from memory. This is the C value (1/B) in the logarithm example given above. And in the exponential example given in the Background of the Invention, the value log(2) is needed. Moreover, some index calculation is involved. In the logarithm example, it is the extraction of the leading bits, and in the exponential example, it is the calculation of N. In some microprocessor computing devices, even in the best scenario, loading one constant alone, results in considerable latency. For instance, loading a constant in the Itanium(R) microprocessor can result in a latency of 11 cycles.

Figure 6:
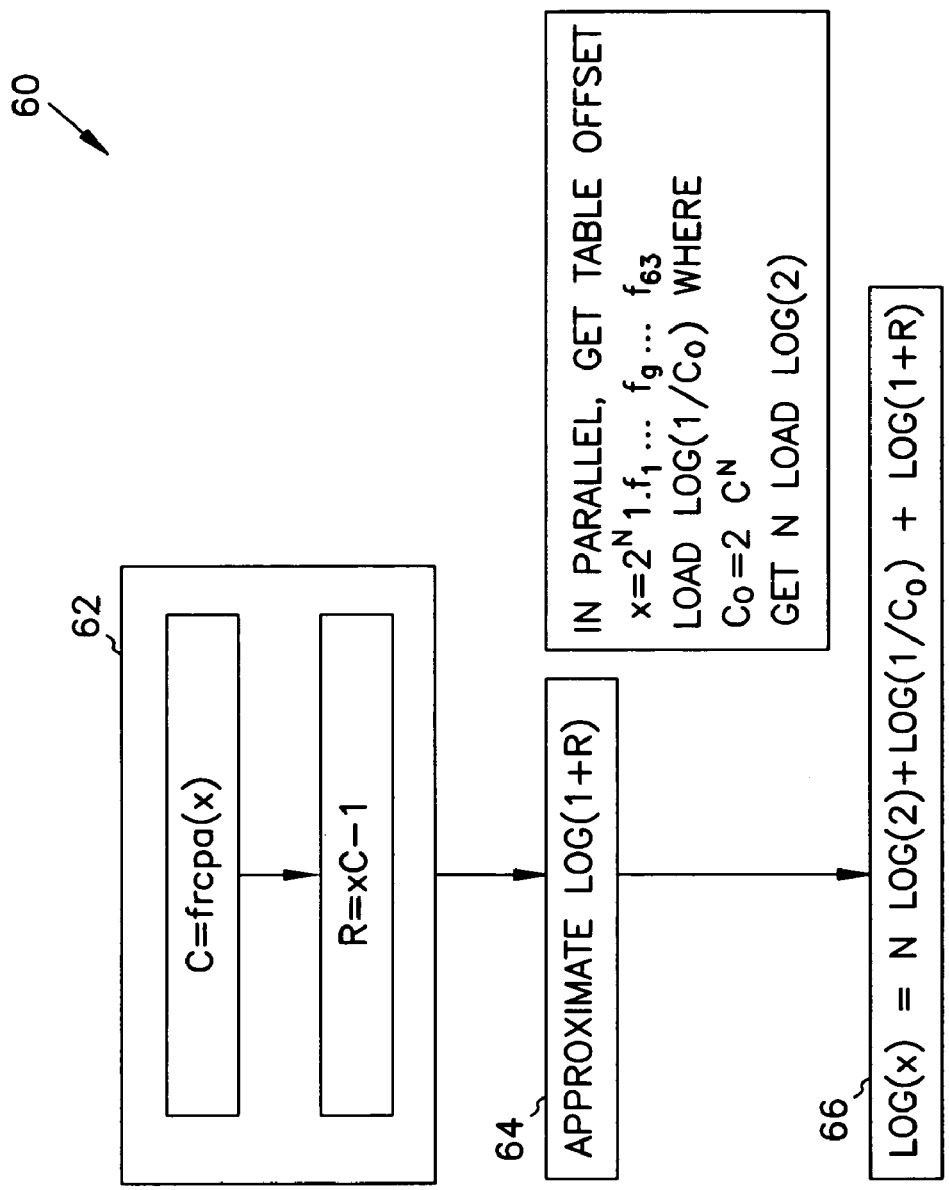
FIG. 6 illustrates the operations for evaluating a logarithm function log(X), according to one embodiment of the invention.

As illustrated in the reduction stage 62 shown in FIG. 6, the present invention exploits a hardware architectural feature, provided in the Itanium(R) microprocessor, of a hardware approximate reciprocal table (23 in FIG. 2). Using this feature, both time consuming factors noted above, are attenuated simultaneously. First, the approximate reciprocal instruction (denoted as "frcpa" in the Itanium(R) system) in effect allows a program to index into and fetch from a table within the latency of one floating-point operation, which is 5 cycles in the Itanium(R) system. Second, this approximate reciprocal operation can be used to perform argument reduction that involves only one step. The class of function f that can benefit from this technique are noted above with respect to FIG. 1.

Figure 7:
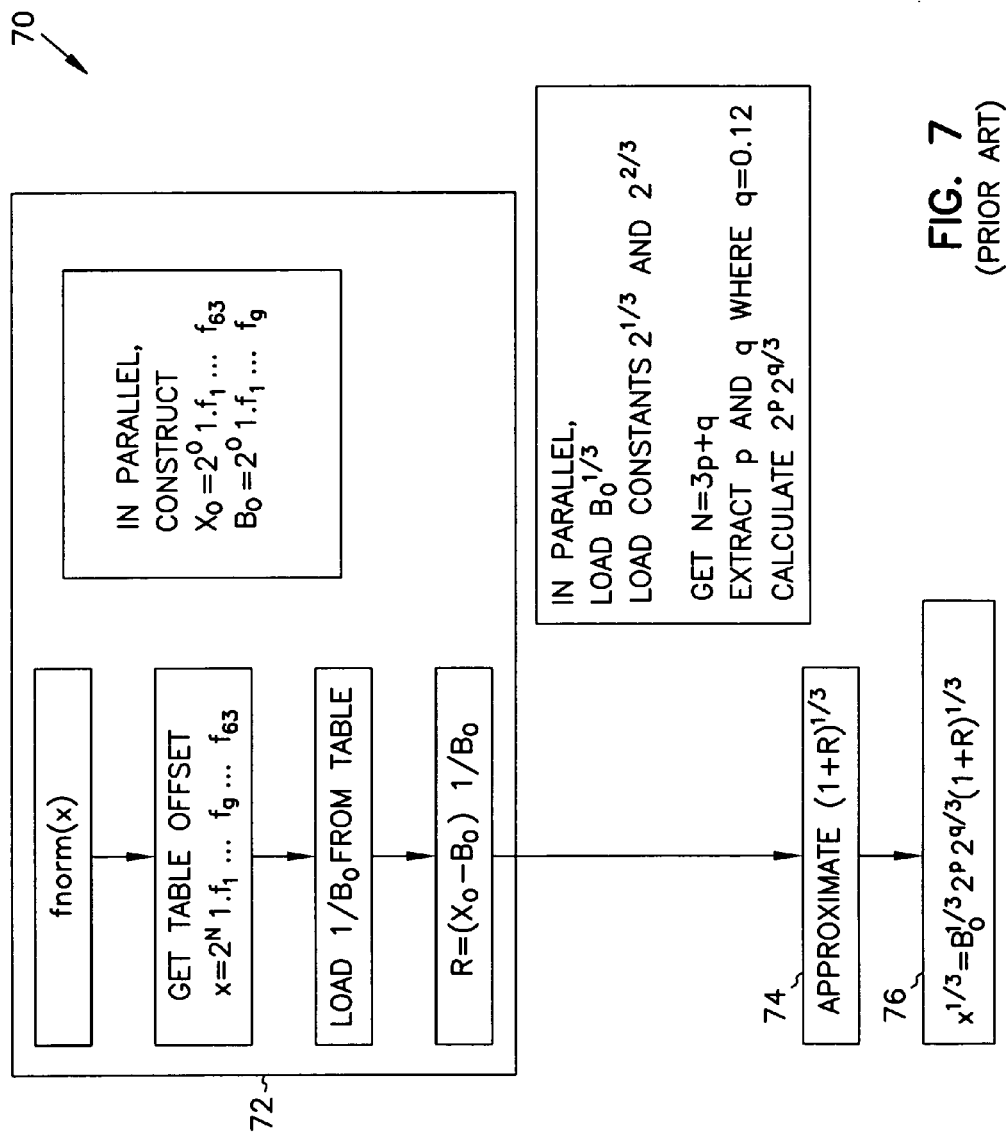
FIG. 7 illustrates conventional operations for performing a cube root.
Figure 8:
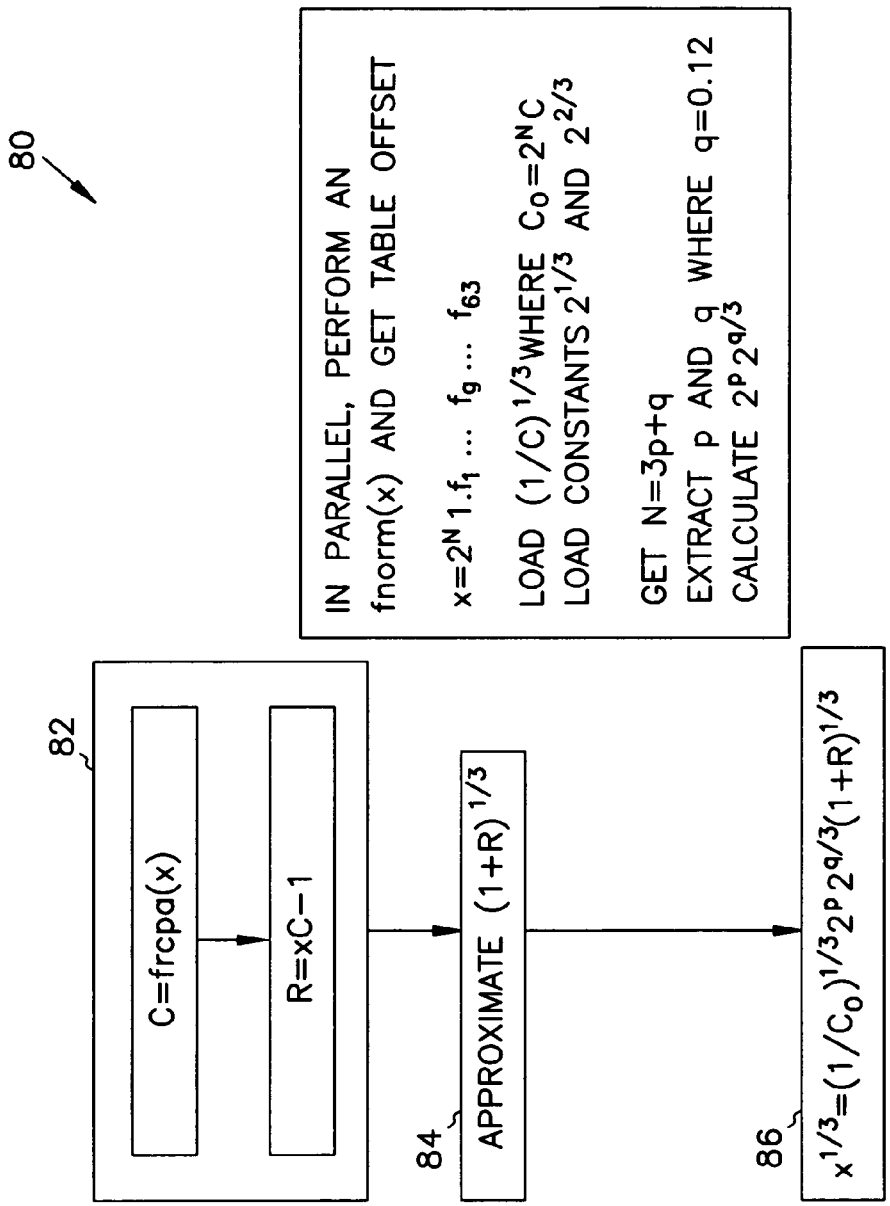
FIG. 8 illustrates the operations for performing a cube root, according to an embodiment of the invention.

Referring now to FIGS. 7 and 8, there are illustrated programs and/or algorithms 70 (stages 72, 74 and 76) and 80 (stages 82, 84 and 86) representative of the conventional approach and the approach of the present invention for performing cube root calculations.

Thus there has been described above programs, processes and devices for improving the speed of computation of certain types of functions in computing devices, and in particular in a computing device with a hardware approximate reciprocal table.

What is claimed is:

1. An apparatus to evaluate an algebraic or transcendental function and make available a result of such evaluation for a scientific computational purpose, the apparatus comprising:
   a processor interfacing with at least one peripheral device;
   an argument reduction unit having a hardware approximate reciprocal table located within the processor, the argument reduction unit to read an approximate reciprocal instruction to use the hardware approximate reciprocal table, and the argument reduction unit to perform an argument reduction stage within a reduction period less than 20% of an overall calculation period of the function;
   a core approximation unit to perform a core approximation stage that includes approximating a polynomial; and
   a final reconstruction unit to obtain a value of the function, wherein the value is based on the argument reduction stage and the core approximation stage, and wherein the value of the function is interfaced to the at least one peripheral device for the scientific computational purpose.

2. An apparatus according to claim 1 further wherein the final reconstruction unit is operative to compute in parallel with the argument reduction and core approximation units.

3. A method to evaluate an algebraic or transcendental function and make available a result of such evaluation for a scientific computational purpose comprising:
   calculating a value of the function on a computer system that comprises at least one processor and at least one peripheral device, wherein the calculating is performed by the processor in an overall calculation period, and wherein the calculating includes,
      performing an argument reduction stage, wherein the argument reduction stage includes using an approximate reciprocal instruction, and wherein the argument reduction stage is performed in a reduction period that is less than 20% of the overall calculation period;
      performing a core approximation stage, wherein the core approximation stage includes approximating a polynomial; and
      performing, based on the argument reduction stage and the core approximation stage, a final reconstruction stage to obtain the value of the function; and
   interfacing the value of the function to the at least one peripheral device for the scientific computational purpose.

4. The method of claim 3, wherein the obtaining the value in the final reconstruction stage occurs in parallel with generating a reduced argument in the argument reduction stage and approximating the polynomial in the core the approximation stage.

5. A computer system to evaluate an algebraic or transcendental function and make available a result of such evaluation for a scientific computational purpose, the computer system comprising:
   a motherboard interfacing with one or more peripheral devices;
   a processor mounted on the motherboard, the processor including an approximate reciprocal table hardware unit; and
   a computer program configured to operate on the processor to perform a multi-stage computation of a function f including an argument reduction stage that uses the reciprocal table hardware unit, wherein the argument reduction stage computes an argument reduction R such that $C:=I(X)$ and $R:=X\times C-1$, wherein computing each of $C:=I(X)$ and $R:=X\times C-1$ is done within a latency of five cycles one processor, wherein the argument reduction stage is performed within a reduction period less than 20% of an overall calculation period of the function; wherein I is an approximate reciprocal instruction on the processor, and wherein a result of the computation is interfaced to the one or more peripheral devices for the scientific computational purpose.

6. The computer system of claim 5, wherein the multi-stage computation of the function f further includes a core approximation stage and a final reconstruction stage.

7. The computer system of claim 5, wherein the function f is in a class of functions that exhibit a i) multiplicative property such that $f(U \times V) = g(f(U), f(V))$, and ii) simple mapping of $2^N$ such that $f(2^N)$ is calculated, where N is an integer.

8. The computer system of claim 7, wherein g is addition for a logarithm function, and g is multiplication of cube root or inverse square root.

9. The computer system of claim 7, wherein the function f is a logarithm function, and wherein $f(2^N)$ is calculated based on N and constant log(2).

10. The computer system of claim 7, wherein function f is a cube root function, and wherein $f(2^J)$ for J=0, 1, 2 need only be tabulated.

11. A tangible machine readable medium including instructions which, when executed by a machine coupled to at least one peripheral device, cause the machine to perform operations to evaluate an algebraic or transcendental function and make available a result of such evaluation for a scientific computational purpose, the operations comprising:

calculating a value of the function, wherein the calculating is performed in an overall calculation period, and wherein the calculating includes, performing an argument reduction stage, wherein the argument reduction stage includes using an approximate reciprocal instruction, and wherein the argument reduction stage is performed in a reduction period that is less than 20% of the overall calculation period;

performing a core approximation stage, wherein the core approximation stage includes approximating a polynomial; and performing, based on the argument reduction stage and the core approximation stage, a final reconstruction stage to obtain the value of the function; and interfacing the value of the function to the least one peripheral device for the scientific computational purpose.

12. The tangible machine readable medium of claim 11, wherein the obtaining the value in the final reconstruction stage occurs in parallel with generating a reduced argument in the argument reduction stage and approximating the polynomial in the core approximation stage.

* * * * *

UNITED STATES PATENT AND TRADEMARK OFFICE
CERTIFICATE OF CORRECTION

PATENT NO. : 7,366,748 B1  
APPLICATION NO. : 09/609496  
DATED : April 29, 2008  
INVENTOR(S) : Tang et al.

It is certified that error appears in the above-identified patent and that said Letters Patent is hereby corrected as shown below:

On the Title page, in field (56), under "Other Publications", line 9, delete "Trnascendental" and insert -- Transcendental --, therefor.

In column 6, line 43, after "core" delete "the".

In column 6, line 61, after "five cycles" delete "one" and insert -- on the --, therefor.

In column 8, line 16, delete "least" and insert -- at least --, therefor.

Signed and Sealed this

Fifth Day of August, 2008

JON W. DUDAS  
*Director of the United States Patent and Trademark Office*